(No Model.)
S. B. MORSS & T. F. BOURNE.
SULPHUR CANDLE.
No. 462,085. Patented Oct. 27, 1891.
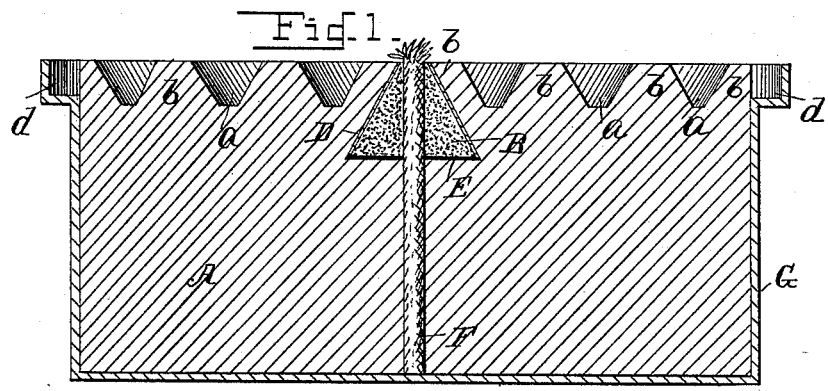
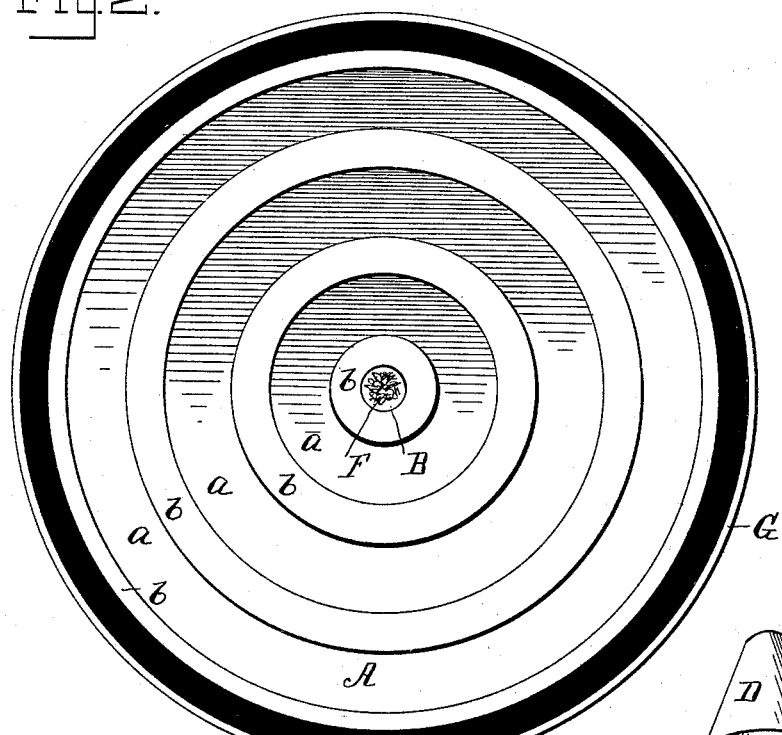
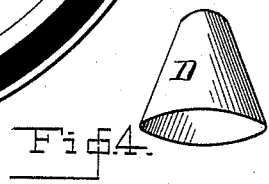
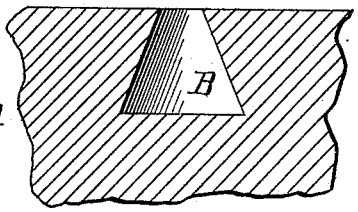
Witnesses
W. H. Courtland
Miles W. Brooks
Inventors
Stephen B. Morss
and
T. F. Bourne

UNITED STATES PATENT OFFICE.

STEPHEN B. MORSS, OF RAHWAY, NEW JERSEY, AND THEODORE F. BOURNE, OF CLIFTON, NEW YORK.

SULPHUR CANDLE.

SPECIFICATION forming part of Letters Patent No. 462,085, dated October 27, 1891.

Application filed May 19, 1891. Serial No. 393,258. (No model.)

*To all whom it may concern:*

Be it known that we, STEPHEN B. MORSS, of Rahway, Union county, New Jersey, and THEODORE F. BOURNE, of Clifton, Richmond county, New York, have invented certain new and useful Improvements in Sulphur Candles, of which the following is a specification.

Our invention relates to sulphur candles for disinfectant purposes.

The object of our invention is to provide a sulphur candle that can be readily ignited; and the improvement consists in undermining the surface of the candle so that a flame will attack and ignite the sulphur quickly and positively.

The invention also consists in the novel details of improvement that will be more fully hereinafter set forth, and then pointed out in the claims.

Reference is to be had to the accompanying drawings, forming part hereof, wherein Figure 1 is a vertical central cross-section of a sulphur candle embodying our invention. Fig. 2 is a plan view of the same. Fig. 3 is a sectional detail view of the candle, showing the undermining-cavity; and Fig. 4 is a perspective view of a mold for forming the undermining-cavity in the candle. We find that sulphur when molded into a block or mass becomes hard and is difficult to ignite when a flame is applied to its upper surface, and, further, on account of the fumes that rise, a person cannot long remain in proximity to the candle in order to insure its ignition. We therefore, in order to overcome these difficulties, undermine the surface of the candle and form a cavity therein, wherein a flame can be made to burn that will attack the sulphur above it and around it, whereby the sulphur will become readily and positively ignited.

In the drawings, the letter A indicates a candle preferably made by molding melted sulphur or sulphur as an ingredient into the desired form, and B is a cavity or chamber in the block or mass of sulphur, whereby the surface of the latter is undermined. This cavity is preferably made larger beneath the surface of the candle A than at the surface, in order to form overhanging walls, so that the flame will reach the sulphur around and above it (the flame.) This cavity may be formed by any suitable means; but we find it advantageous to use a hollow mold D, having a suitable outline and made of combustible material—say paper. This mold D is shown open at both ends and in the form of a truncated cone, and it is shown in Fig. 1 filled with a suitable combustible material E—say cotton, paper, or the like—or a suitable combustible powder.

F is a suitable wick, shown extending through the cavity B and also through the center of the candle, which when lighted acts to ignite the combustible material E. To form the cavity B in the candle A by means of the mold-form D, the latter is placed small end down in a suitable mold, (the large end of mold D being first closed by any suitable means, say a piece of paper,) and then the melted sulphur is poured into the large mold and surrounds the mold D, leaving the cavity as in Fig. 1. The mold D may then be removed, leaving the cavity as in Fig. 3, in which a combustible may afterward be inserted, or the mold D may be left in the cavity B to assist in igniting the sulphur, which latter is preferable, or the combustible E and wick F may be first placed in the mold form D and then the sulphur be molded around it, so that when the candle is withdrawn from its mold it will have the cavity B beneath its surface already filled with a combustible. With this construction, when the wick is lighted the combustible will burn and open the cavity and ignite the sulphur surrounding it, which as it melts will fall into the cavity beneath the surface of the candle, forming a sort of lake of burning sulphur, which gradually spreads out, consuming the sulphur above and around it until the entire candle is consumed. By this method of undermining the surface of the candle a perfect consumption of the candle is assured.

Although the surface of the candle A may be flat, as in Fig. 3, or of any desired outline, we find it advantageous to join a number of annular concentric (or other shaped) depressions $a$ on the top of the candle, leaving corresponding ridges $b$, as in Figs. 1 and 2, whereby the sulphur as it burns from the center ridge $b$ of the candle will flow into said depressions and be prevented from running to and over the sides of the candle, but will gradually eat its way along the top of the candle, consuming the ridges consecutively, whereby the candle will burn more from the center, the parts above gradually melting and running down into the burning portion. The candle may be bound by a metal or non-combustible ring or band G, having a bottom or not, as desired, and in order to catch any sulphur that might run over the side of the candle a chamber $d$ is made between the sides of the candle and the band G at the upper part, and for this purpose said band is made larger, as at $d$, than at the lower part, so as to leave a chamber or space between the candle and band. (See Fig. 1.)

Having now described our invention, what we claim is—

1. A sulphur candle composed of a mass or block of sulphur having a combustion cavity or chamber that is larger beneath its upper part than at its upper part, whereby overhanging walls of sulphur are formed, substantially as described.

2. A sulphur candle having a cavity or chamber beneath its surface and a hollow combustible mold D within said cavity, substantially as described.

3. A sulphur candle having a cavity or chamber beneath its surface, a hollow mold D within said cavity, and combustible material within said mold, substantially as described.

4. A sulphur candle having a series of depressions with corresponding ridges to prevent the too quick spread of melted sulphur over its surface, substantially as described.

5. The combination of a candle with a band G surrounding it, and a chamber between the upper parts of said candle and band, substantially as described.

In testimony that we claim the foregoing as our invention we have signed our names, in presence of two witnesses, this 18th day of May, 1891.

STEPHEN B. MORSS.
THEODORE F. BOURNE.

Witnesses:
THEODORE BOURNE,
MILES W. BROOKS.